US007792805B2

(12) United States Patent
Shavit et al.

(10) Patent No.: US 7,792,805 B2
(45) Date of Patent: Sep. 7, 2010

(54) FINE-LOCKED TRANSACTIONAL MEMORY

(75) Inventors: Nir N. Shavit, Cambridge, MA (US); David Dice, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 658 days.

(21) Appl. No.: 11/443,234

(22) Filed: May 30, 2006

(65) Prior Publication Data

US 2007/0282838 A1 Dec. 6, 2007

(51) Int. Cl.
*G06F 17/30* (2006.01)
*G06F 17/00* (2006.01)

(52) U.S. Cl. ....................................................... 707/704
(58) Field of Classification Search ...................... 707/8
See application file for complete search history.

(56) References Cited

U.S. PATENT DOCUMENTS

| 5,280,612 | A  | * | 1/1994 | Lorie et al. ..................... 707/8 |
| 6,115,715 | A  | * | 9/2000 | Traversat et al. ............ 707/100 |
| 2004/0015642 | A1 |   | 1/2004 | Moir et al. |
| 2004/0187123 | A1 | * | 9/2004 | Tremblay et al. ........... 718/100 |
| 2005/0283781 | A1 | * | 12/2005 | Karp et al. ................... 718/100 |
| 2006/0085591 | A1 | * | 4/2006 | Kumar et al. ................ 711/113 |
| 2006/0225077 | A1 | * | 10/2006 | Anderson .................... 718/104 |

OTHER PUBLICATIONS

Ammann et al., "An Efficient Multiversion Algorithm For Secure Servicing Of Transaction Reads", 1994, ACM, p. 118-125.*
Harris et al., "Revocable Locks for Non-Blocking Programming", 2005, ACM, p. 72-82.*
Greenwald ("Two-Handed Emulation: How to build non-blocking implementations of complex data-structures using DCAS", 2002, ACM).*
Michael ("Scalable Lock-Free Dynamic Memory Allocation", 2004, ACM).*
Gray et al. ("Granularity of Locks in a Shared Data Base", 1975, ACM).*

(Continued)

*Primary Examiner*—James Trujillo
*Assistant Examiner*—Dawaune Conyers
(74) *Attorney, Agent, or Firm*—Robert C. Kowert; Meyertons, Hood, Kivlin, Kowert & Goetzel, P.C.

(57) ABSTRACT

A method comprises associating a plurality of locks with a data object accessed concurrently by a plurality of threads, where each lock corresponds to a respective partition of the object. The method includes using a first non-blocking transaction (such as a Hardware Transactional-Memory (HTM) transaction) to attempt to complete a programmer-specified transaction. The first non-blocking transaction may access one or more of the locks but may not actually acquire any of the locks. In response to an indication that the first non-blocking transaction failed to complete, the method may include acquiring a set of locks in another non-blocking transaction, where the set of locks corresponds to a set of partitions expected to be accessed in the programmer-specified transaction. If the set of locks is acquired, the method may include performing the memory access operations of the programmer-specified transaction, and releasing the set of locks.

20 Claims, 7 Drawing Sheets

OTHER PUBLICATIONS

Nir Shavit, et al., "Software Transactional Memory," 14$^{th}$ ACM Symposium on the Principles of Distributed Computing, 1995, 33 pages.

Tim Harris, et al. "Language Support for Lightweight Transactions," ACM, 2003, 14 pages.

Maurice Herlihy, et al., "Transactional Memory: Architectural Support for Lock-Free Data Structures," Proceedings of the 20$^{th}$ International Symposium in Computer Architecture, 1993, pp. 289-300.

* cited by examiner

FINE-LOCKED TRANSACTIONAL MEMORY

BACKGROUND OF THE INVENTION

1. Field of the Invention

The present invention is directed to computer systems. More particularly, it is directed to coordination mechanisms for concurrent programming in computer systems.

2. Description of the Related Art

In the field of computer systems, considerable effort has been expended on developing techniques to support concurrent access to shared resources. Mutual exclusion locks and monitors represent two traditional concurrent programming synchronization mechanisms. Locks and monitors protect shared resources by separating access to them in time; for example, in one implementation, as long as a given thread of execution retains a lock on an object or resource, no other thread of execution may modify the object, and any other thread attempting to modify the object may be blocked from further execution until the lock is released.

However, traditional locking techniques are known to suffer from several limitations. Coarse-grained locks, which protect relatively large amounts of data, often do not scale. For example, threads of execution on a multiprocessor system may block each other even when they do not actually require concurrent access to the same addresses. Fine-grained locks may resolve some of these contention issues, but in traditional locking techniques, this may be achieved only at the cost of added programming complexity and the increased likelihood of problems such as deadlocks. Locking schemes may also lead to an increased vulnerability to thread failures and delays—e.g., a thread that is preempted or does expensive input/output operations while holding a lock may obstruct other threads for relatively long periods, thereby potentially reducing the overall throughput of the system.

The transactional-memory programming paradigm has been gaining momentum as an approach of choice for replacing locks in concurrent programming. In transactional-memory programming, single-threaded sequences of concurrent operations may be combined into non-blocking atomic transactions, thus making parts of the code appear to be sequential without requiring locks. Executing threads indicate transaction boundaries, e.g., by specifying when a transaction starts and when it ends, but may not have to acquire locks on any objects. Transactional-memory programming techniques may allow transactions that do not overlap in data accesses to run uninterrupted in parallel; transactions that do overlap may be aborted and retried.

Transactional-memory may, at least in principle, be implemented using special hardware support (e.g., by enhancing existing hardware memory management mechanisms to support atomic programmer-specified transactions) and/or using software-only techniques (e.g., using extensions to conventional programming languages such as Java™). Support for hardware transactional-memory (HTM) has not yet been implemented extensively, however, at least in commercially available systems; as a result, current implementations of transactional-memory are largely software based. Unfortunately, conventionally known software transactional-memory (STM) implementations are fairly inefficient, in part because of the need to provide a mechanism to allow one transaction to roll back another. In addition, most HTM implementations developed within the near term are expected to place relatively severe limits on allowed transaction size (i.e., on the number of operations that may be performed within a given transaction) supported entirely in hardware.

SUMMARY

Various embodiments of methods and systems for coordinating concurrent accessed to shared data objects using fine-locked transactional-memory techniques are disclosed. According to one embodiment, a method comprises associating a plurality of locks with a data object accessed concurrently by a plurality of threads. Each lock of the plurality of locks corresponds to a respective partition of the data object; in some embodiments, relatively fine-grained locks (e.g., one lock per memory word) may be implemented by partitioning the data object appropriately. The method may include using a first non-blocking transaction (such as a hardware transactional-memory (HTM) transaction) to attempt to complete a programmer-specified transaction (e.g., a transaction whose boundaries are indicated by the programmer within application code). The first non-blocking transaction may access (i.e., read) one or more of the locks corresponding to partitions to be accessed in the programmer-specified transaction, e.g., to check that the locks are not currently owned by other threads, but may not actually acquire any of the locks. In response to an indication that the first non-blocking transaction failed to complete (e.g., if the first non-blocking transaction is an HTM transaction that exceeds the limits imposed on transaction length by the underlying hardware), the method may include acquiring a set of locks in an other non-blocking transaction of the particular thread (e.g., in another HTM transaction), where the set of locks corresponds to a set of partitions expected to be accessed in the programmer-specified transaction. If the set of locks is acquired, the method may include performing the memory access operations of the programmer-specified transaction, and releasing the set of locks. The locks may be released atomically, e.g., again using an HTM transaction. The techniques described above may be employed to support arbitrarily long programmer-specified transactions using relatively short non-blocking transactional-memory operations to automatically acquire and/or release fine-grained locks in a deadlock-free manner. If HTM transactions are not supported in an embodiment, software transactional-memory (STM) operations may be used for each of the non-blocking transactions.

In one embodiment, if the first non-blocking transaction fails, the operations of the programmer-specified transaction may be performed within a software transactional-memory (STM) transaction. Thus, for example, an HTM transaction may be used to attempt to acquire the locks within the STM transaction, and another HTM transaction may be used to release the locks if they are successfully acquired. If the HTM transaction attempting to acquire the locks fails, in one embodiment the method may comprise acquiring the locks within the STM transaction in a sequence that guarantees that no deadlocks will occur, e.g., in order of addresses of partitions to be locked. A thread may not be required to abort or commit any other thread in such an embodiment, thus avoiding the overhead that may be required to support inter-thread aborts or commits in some traditional STM implementations.

In another embodiment, a plurality of lock modes, such as read locks, write locks and conditional read locks, may be supported. If a thread is to read (but not modify) a partition, in some embodiments a probability function may be used to determine whether the thread is to acquire a read lock on the partition, or whether a low-overhead "conditional read lock" mechanism is to be used instead. Acquiring the read lock may require that a field of the lock be updated, e.g., to update the current number of concurrent read lock holders. Since substantial overhead may be involved for writing to shared locations such as the data structures for the locks, especially for HTM transactions, a conditional read lock mechanism that avoids writes may be used instead in some embodiments. The conditional read lock mechanism may, for example, include maintaining within each lock a field whose value is changed only when the number of concurrent read lock holders of the corresponding partition drops to zero (thus indicating that the corresponding partition may be potentially updated by a write lock holder). The value of this field may be stored, e.g., within a thread-local variable by a reading thread, instead of the reading thread acquiring a read lock. Later, after all the locks expected to be needed for the programmer-specified transaction have been acquired, the current value of the field may be compared to the value stored in the thread-local variable. If the two values are identical, this may indicate that the partition has not been modified since the field value was stored in the thread-local variable; thus, the thread may obtain the benefit of acquiring a read lock without the overhead of actually acquiring a read lock. If the values differ, in some embodiments the thread may be aborted because the data of the corresponding partition may have changed since the conditional read lock was acquired.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED-DESCRIPTION OF EMBODIMENTS

Figure 1:
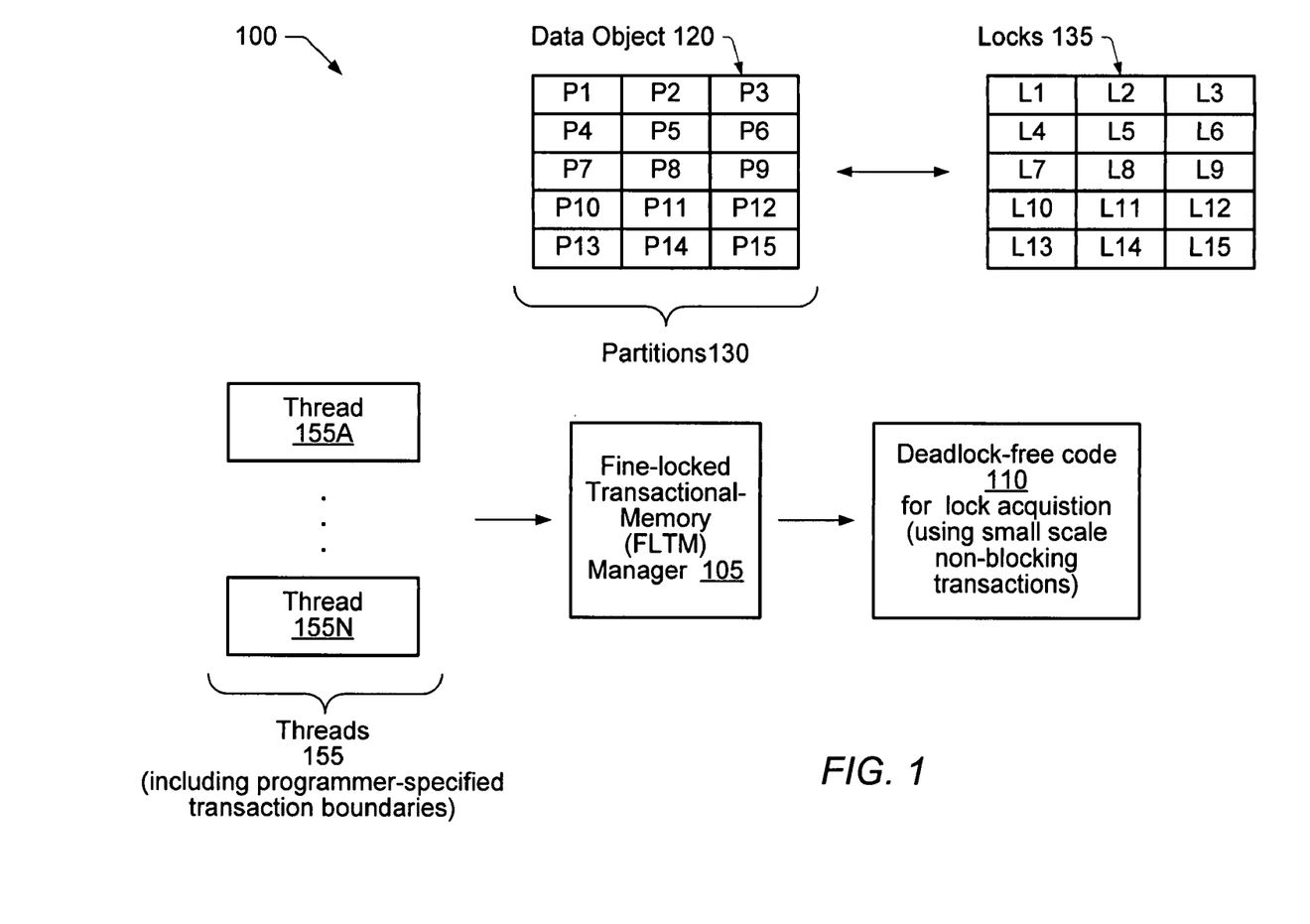
FIG. 1 is a block diagram illustrating one embodiment of a system.

FIG. 1 is a block diagram illustrating one embodiment of a system 100. The system includes a plurality of threads 155 (e.g., threads 155A-155N) and a fine-locked transactional-memory (FLTM) manager 105 configured to coordinate concurrent accesses from the threads 155 to a shared data object 120. One or more of the thread 155 may include programmer-specified transaction boundaries (e.g., "TransactionStart" indicating the start of a transaction and "TransactionCommit" indicating the end of a transaction) identifying sequences of operations that are to be performed atomically. The programmer-specified transactions may be arbitrarily long, e.g., in embodiments where the underlying hardware includes a special transactional cache for hardware transactional-memory (HTM) operations, the number of memory access operations within a given programmer-specified transaction may in some cases exceed the transaction size limits imposed by the transactional cache. The data object 120 may be logically divided into a plurality of partitions 130 (e.g., partitions P1-P15), e.g., either automatically, or in response to programmer-provided input, by FLTM manager 105. FLTM manager 105 may also be configured to associate a respective lock 135 with each partition 130—for example, in the depicted configuration, lock L1 may be associated with partition P1, lock L2 with partition P2, and so on. Partitions 130 may also be referred to as "stripes" or "sections" in various embodiments. Locks 135 may support several locking modes in some embodiments, including for example a read mode and a write mode, and each lock 135 may include one or more writable fields, as described below in conjunction with the description of FIG. 2. In some implementations, a given lock 135 may protect a plurality of partitions 130—e.g., a hash function on a partition address may be used to determine the location of the lock corresponding to the partition, and two or more partition addresses may be mapped to the same lock object 135.

FLTM manager 105 may be configured to use small-scale non-blocking transactions (e.g., relatively short HTM transactions and/or software transactional-memory (STM) transactions) for threads 155 to acquire locks 135 that may be needed to support arbitrarily long programmer-specified transactions. It is noted that the term "transaction" may be used herein to refer to three types of operations: (a) programmer-specified transactions of threads 155, which may be arbitrarily long (b) HTM transactions, whose size may be restricted by hardware constraints and (c) STM transactions, which may also be arbitrarily long. As described below in further detail, FLTM manager 105 may be configured to use HTM transactions and/or STM transactions to implement the programmer-specified transactions within threads 155. Not all embodiments may include support for HTM transactions. In embodiments where HTM transactions are supported, a thread 155 may be configured to first attempt to complete a programmer-specified transaction using an HTM transaction, and may resort to an STM transaction only if the attempt to use an HTM transaction fails. Since HTM transactions may be significantly more efficient than the equivalent STM transactions, the preferential use of HTM transactions may result in better overall performance than if STM alone were used. HTM transactions may also be used within STM transactions to atomically acquire sets of locks and atomically release sets of locks, as described below. In some embodiments, programmers may not even be aware that the data object 120 has been partitioned, that locks 135 are being used, or even whether HTM or STM operations are being used to implement the programmer-specified transactions. Thus, the details of how concurrent accesses are managed may be kept hidden from programmers by FLTM manager 105, and a seamless interaction between hardware and software transactional-memory operations may be supported.

In the embodiment illustrated in FIG. 1, FLTM manager 105 may be configured to automatically generate deadlock-free code 110 to acquire locks 135 for threads 155. To ensure that deadlocks do not occur, for example, a list of all the locks 135 expected to be needed for a particular programmer-specified transaction may first be prepared, and then the locks may be acquired in order of the addresses of the corresponding partitions 130. The deadlock-free code 110 may ensure that if any locks 135 are needed for a given transaction, either all the needed locks are acquired prior to memory accesses being performed on partitions 130, or the transaction aborts itself and retries. As a result, a given transaction may not need to be able to commit or abort other transactions in the embodiment of FIG. 1. Thus, there may be no need for FLTM manager 105 to provide a mechanism for allowing one transaction to cause another transaction to be rolled back, which is a major source of overhead in many traditional STM implementations. In addition, as also described below in further detail, the locking scheme implemented by FLTM manager 105 may use a number of techniques to reduce the number of write operations that have to be performed on locks 135 in various embodiments. Since write operations to shared data typically require more overhead than reads, a reduction in the number of write operations may significantly increase the overall efficiency of concurrent operations of threads 155.

Different partitioning granularities for data object 120, and therefore different locking granularities, may be implemented in various embodiments. For some types of concurrent applications and corresponding data objects 120, fairly coarse-grained locks may be sufficient to provide the desired performance; for other applications and other data objects 120, fine-grained locking may be preferable. In some embodiments, for example, each partition 130 may correspond to a single memory word, or may comprise an amount of data that can be stored within a single hardware cache line. Data objects 120 may be partitioned automatically (e.g., without user input) in some embodiments, while in other embodiments user input may be used to determine partition boundaries and/or the mappings between partitions 130 and corresponding locks 135. In some embodiments the process of partitioning the data object 120 may simply involve identifying a mapping function to be used to locate a lock 135 for a given partition or memory address.

By automatically generating locking code 110 that avoids deadlocks even for fine-grained locks, FLTM manager 105 may eliminate one of the major disadvantages of many traditional locking techniques while retaining the concurrency advantage of fine-grained locks. In some cases, asymmetric partitioning may be implemented for a given data object 120: e.g., one partition 130 of the given data object may be larger than another partition 130, so that the amount of data protected by a given lock of a set of locks 135 may differ from the amount of data protected by another lock. In one implementation where the data object is a tree, for example, memory locations associated with the root node of the tree (which may be modified relatively infrequently) may all be included within a single partition 130, while a given leaf node may be divided into several partitions 130, as the leaf nodes may be modified more frequently by different transactions. In some embodiments, partitions 130 may be dynamically modified based on observed access patterns to the underlying data: e.g., when a data object 120 is initialized, it may be divided into N partitions 130, and the number of partitions (or the size of one or more of the partitions) may later be modified based on how frequently different parts of the data object are accessed or modified.

As noted above, threads 155 may be configured to utilize HTM transactions and/or STM transactions in various embodiments in which FLTM manager 105 is employed to manage concurrent accesses to data objects 120. Any of a number of different HTM implementations may be employed in a given embodiment. In one implementation of HTM, for example, a number of special hardware instructions may be supported by the processors on which threads 155 are to be executed. Special memory access instructions may include, for example, a Load-transactional (LT) instruction, a Load-transactional-exclusive (LTX) instruction, and a Store-transactional (ST) instruction. In addition, specialized transaction state manipulation instructions such as COMMIT, ABORT and VALIDATE may also be supported. The LT instruction may read the value of, a shared memory location into a private register, while the LTX instruction may read the value of a shared memory location into a private register and "hint" that the location is likely to be updated. The ST instruction may tentatively write a value from a private register to a shared memory location; the new value may not be visible to other processors until the HTM transaction successfully commits.

The set of locations read by LT instructions may be termed the transaction's "read set"; the set of locations accessed by ST or LTX instructions may be termed the transaction's "write set", and the read set and the write set may together be termed the transaction's "data set". The COMMIT instruction may attempt to make the transaction's tentative changes permanent; COMMIT may succeed only if no other HTM transaction has updated any location in the transaction's data set and no other HTM transaction has read any location in the transaction's write set. The ABORT transaction may discard all updates to the write set. The VALIDATE instruction may test current transaction status: a successful VALIDATE may return a result indicating that the current transaction has not aborted (although it may abort later), or return a result indicating that the current transaction has aborted and discard the transaction's tentative updates. These HTM instructions may be combined (together with other, non-transactional instructions supported by the hardware) to implement programmer-specified transactions. In addition, in some HTM implementations, each processor may maintain at least two primary caches: a regular cache for non-transactional operations, and a special transactional cache for transactional operations. The transactional cache may include logic to facilitate transaction commit and abort, e.g., with the help of transactional tags and an extended cache coherence protocol. The transactional cache may hold tentative writes for a transaction, without propagating them to other processors or to main memory unless the transaction commits. The size of the transactional cache may place a strict limit the size of the transactions that can be supported by the HTM implementation: e.g., if the size of the data transactionally accessed by a given transaction exceeds the space available in the transactional cache, the transaction may have to abort. It is noted that in other HTM implementations, different instructions and/or cache organizations than those described here may be used. FLTM 105 may be configured to utilize any of a variety of HTM implementations in different embodiments.

In one embodiment, support for STM transactions used by threads 155 managed by FLTM manager 105 may be provided using extensions to popular programming languages such as Java™. For example, in one specific implementation in which STM support is provided on a word-addressed basis, memory access operations such as STMRead(address a) and STMWrite(address a, stm_word w) may be provided. The address data type may represent a memory pointer (e.g., a heap address) and the stm_word data type may be a word-length integer. As their names imply, STMRead may be used to transactionally read a memory location and STMWrite may be used for transactional writes. In addition, transaction management operations such as STMStart( ), STMAbort( ), STMCommit( ), and STMValidate( ) may also be provided in various STM implementations. STMStart may begin a new transaction within an executing thread 155, while STMAbort may abort the transaction in progress by the executing thread. STMCommit may attempt to commit the transaction in progress. STMValidate may indicate whether the current transaction would be able to commit—i.e., whether the values read represent a current and mutually consistent snapshot and whether any locations updated have been subject to conflicting updates by another transaction. Various data structures may also be maintained to support STM transactions, such as transaction descriptors (indicating for example the current state of a transaction and the memory locations accessed by the transaction) and ownership records (indicating version numbers or current owner threads for various memory locations). STM mechanisms that extend programming languages may require compiler and/or virtual machine (e.g., Java™ virtual machine (JVM)) changes in some cases. It is noted that STM may be implemented entirely at the application level in some embodiments, e.g., without requiring changes to programming languages or to any supporting software such as compilers or virtual machines. A particular STM implementation may be executable on a variety of hardware architectures in some embodiments, since it may not rely on architecture-specific hardware features. FLTM 105 may be configured to utilize any of a variety of STM implementations in different embodiments.

Figure 2:
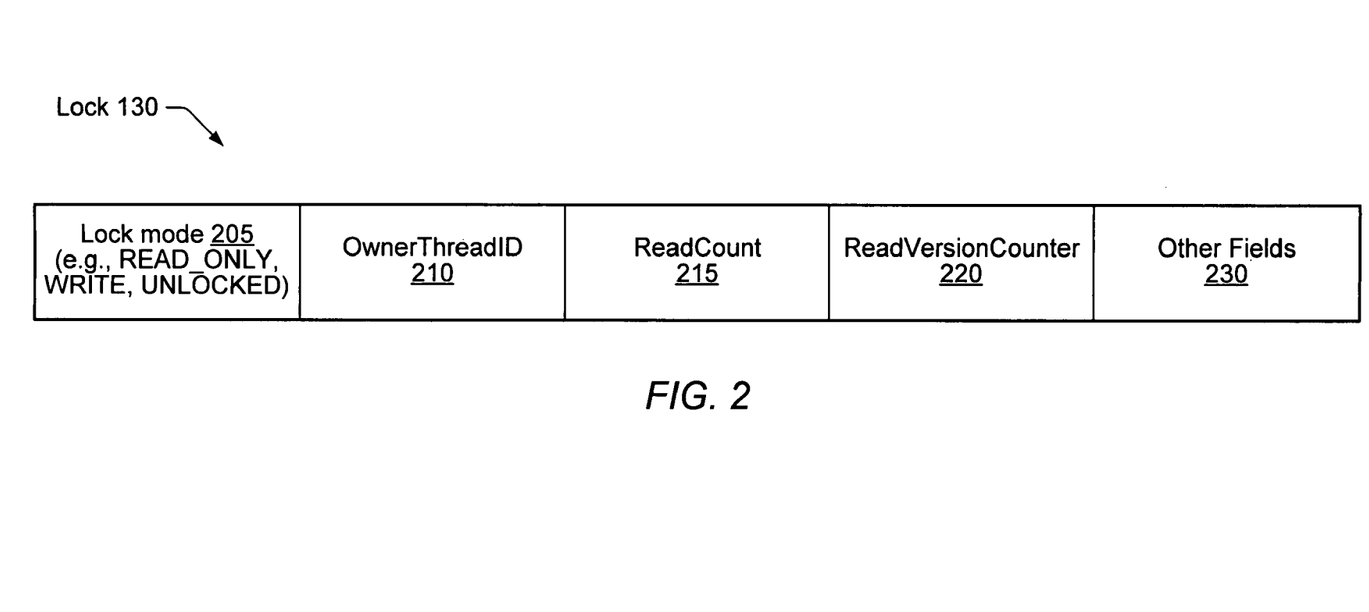
FIG. 2 illustrates constituent elements of a data structure for a lock, according to one embodiment.

FIG. 2 illustrates exemplary constituent elements of a data structure for a lock 135, according to one embodiment. As shown, the lock 135 may include a lock mode 205, which may be set to one of three values: READ_ONLY, indicating that the lock is currently held in read mode, WRITE, indicating that the lock is held in write mode, and UNLOCKED, indicating that the lock is currently not held by any transaction. The term "read lock" may be used herein to indicate a lock held in READ_ONLY mode, and the term "write lock" may be used herein to indicate a lock held in WRITE mode. The lock 135 also includes OwnerThreadID field 210 that may be used to identify a thread 155 that currently holds the lock (e.g., in WRITE mode). In some embodiments, multiple thread IDs may be stored in the lock to identify a plurality of concurrent READ_ONLY mode lock holders. In addition, lock 135 includes a ReadCount field 215, indicating the number of concurrent readers currently holding the lock in READ_ONLY mode, and a ReadVersionCounter field 220 that indicates the number of times that the ReadCount value has been reduced from a non-zero value to zero. The ReadVersionCounter field 220 may be used in some embodiments to implement a conditional read lock mode and avoid updating the ReadCount field under some circumstances; further details on the use of ReadVersionCounter in such embodiments are provided below. In addition, the lock 135 may also include various other fields 225 in other embodiments.

It is noted that in some embodiments, a lock mode indicator may not be stored as a separate field 205 of the lock 135. Instead, it may be possible to deduce the lock mode from the other fields: e.g., if OwnerThreadID is set to a non-negative value while ReadCount is set to zero, this may indicate that the lock is currently held in WRITE mode; if ReadCount is nonzero, this may indicate that the lock is currently held in READ_ONLY mode; and if ReadCount is zero and OwnerThreadID is set to a special value, this may indicate that the lock is currently not held by any thread. In some embodiments, each lock 135 may be limited in size to a single cache line of the underlying hardware processors, so that cache misses may be reduced or avoided during lock content inspection or modification. In one embodiment, when a data object 120 is allocated, memory for the locks 135 may be allocated adjacent to the memory for the corresponding partition 130, so that when a given partition is loaded into a cache, the lock for the partition may also be automatically loaded into the cache. This approach may help to reduce the number of cache misses encountered when accessing or modifying the lock 135 for a given partition 130. In some embodiments, a WriteVersionCounter field (not shown in FIG. 2) incremented each time the corresponding partition 130 is updated may be included within a lock 135, e.g., instead of or in addition to the ReadVersionCounter field. In some embodiments, a lock 135 may include a pointer to (or an address of) the partition 130 that it protects.

In another embodiment, locks 135 for a given data object 120 may be stored in a shared array data structure, and the mapping of a lock to a partition address may be determined using a function such as a hash function. In one such embodiment, for a given partition 130, the address (or array index) for the lock 135 for that partition may be obtained by applying a function to the partition's virtual address: e.g., the address L1_addr for lock L1 on partition P1 with address P1_addr may be Hash(P1_addr), where Hash represents a hash function. In some implementations, a given lock 135 may potentially be mapped to two or more partitions 130; in such a scenario, a "lock collision" may be said to occur. In an embodiment where threads 155 execute within a managed runtime environment such as a Java™ Virtual Machine (JVM), where for example a copying or moving garbage collector may be implemented, the virtual address of a given partition 130 may not be fixed, and therefore may not be usable to compute a unique lock address or index. In one such embodiment, to determine the location of a lock for a particular partition 130, a hash value for the contents of data object 120 may be composed or concatenated with an offset within the data object for the partition 130, and the result may be used as input to another hash function, whose result provides the lock location or lock index within an array. In some embodiments, a developer or programmer may provide a specific function or mapping, which may be optimized for the particular data object 120 and/or to reduce lock collisions, to be used for determining lock addresses for partitions 130. In one embodiment, the mapping between locks 135 and partitions 130 may be dynamically modified, e.g., to reduce lock collisions and/or contention for cache lines holding the lock contents. Any of a variety of different implementations of locks 135, and of mappings between partitions 130 and locks 135, may be supported in various embodiments.

Figure 3A:
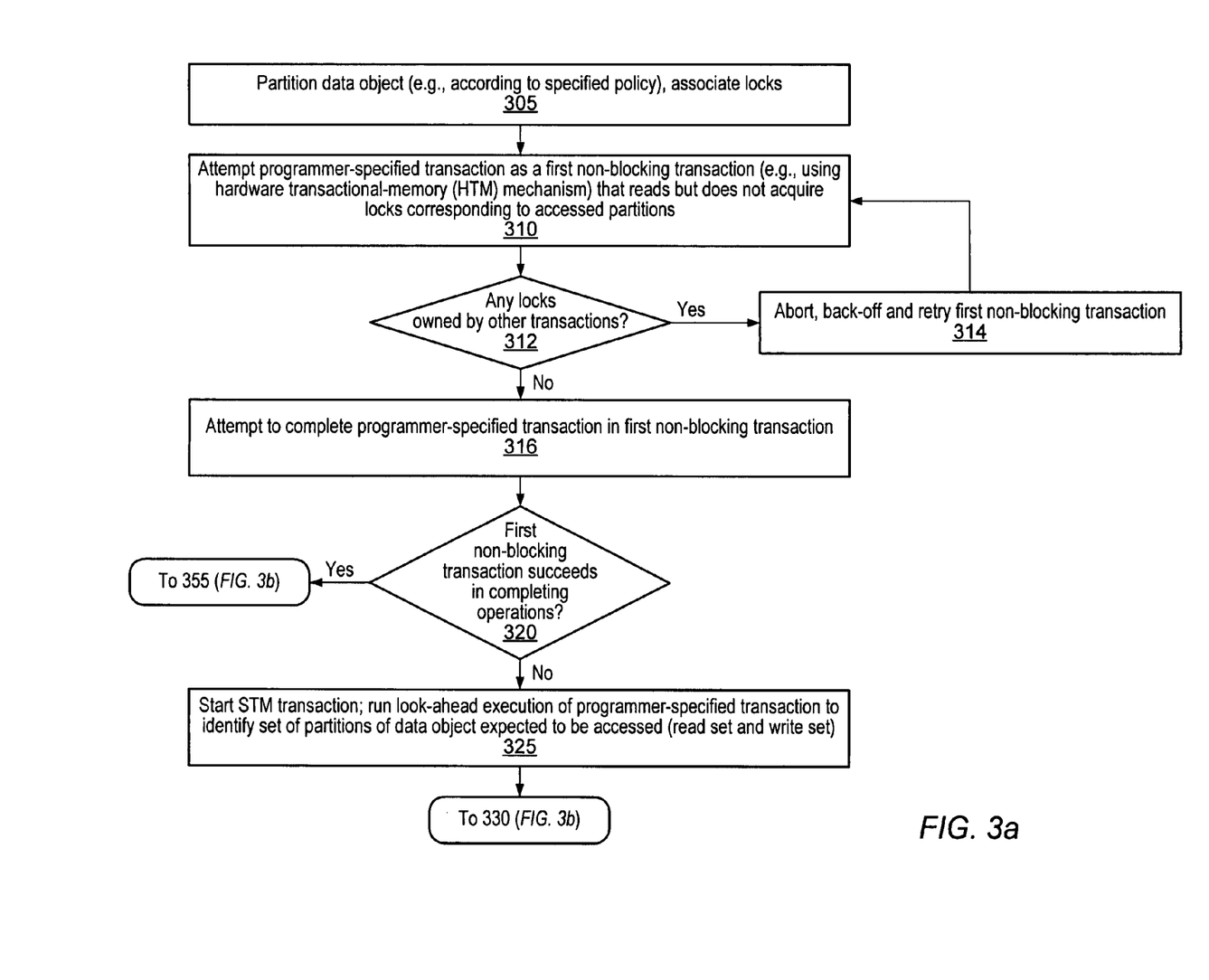
FIG. 3a and FIG. 3b collectively comprise a flow diagram illustrating aspects of the operation of threads managed by a fine-locked transactional-memory (FLTM) manager, according to one embodiment.
Figure 3B:
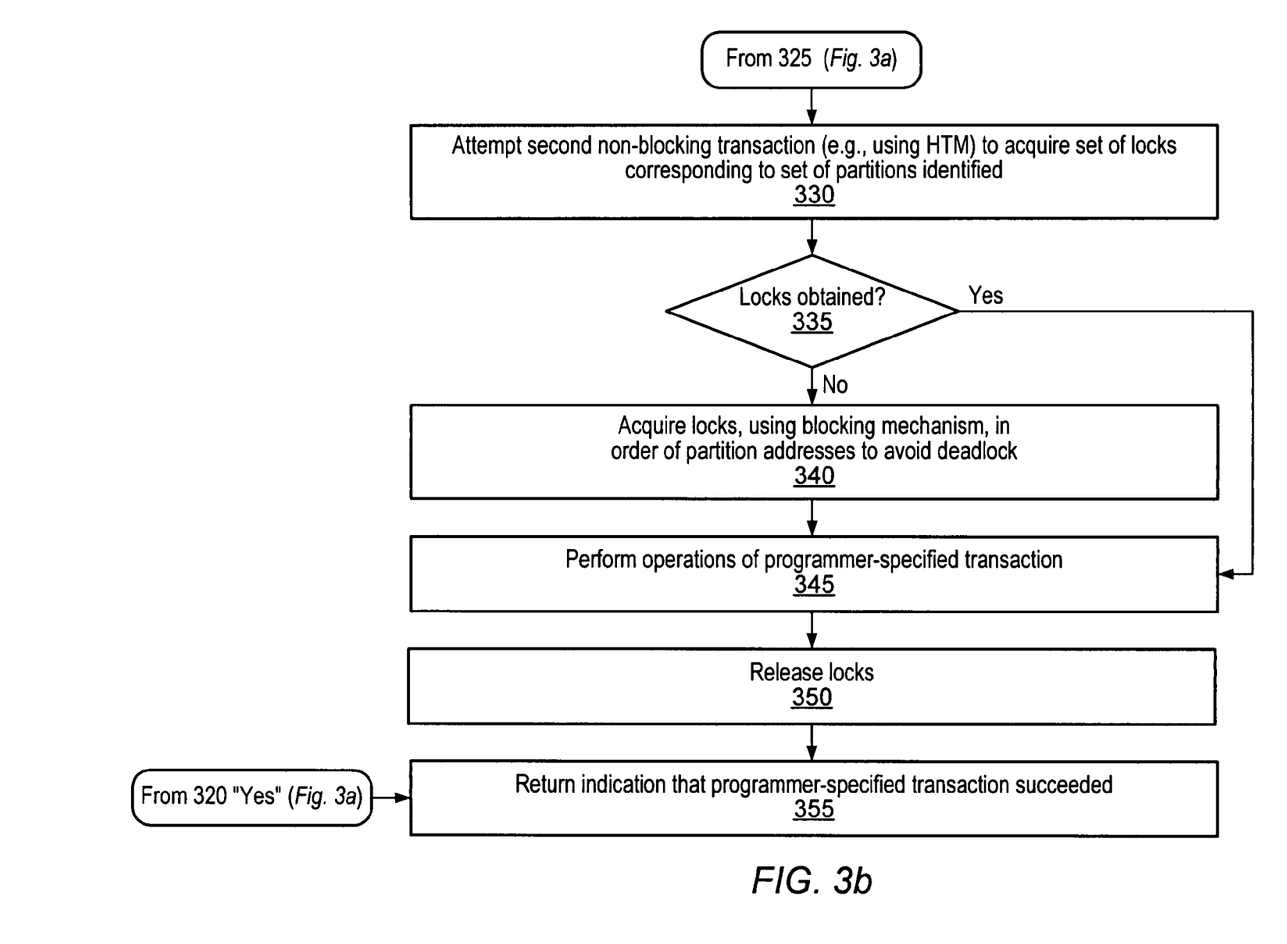

FIG. 3a and FIG. 3b collectively comprise a flow diagram illustrating aspects of the operation of threads managed by FLTM manager 105, according to one embodiment. At a high level, the majority of the operations illustrated in FIG. 3a and FIG. 3b for a given programmer-specified transaction within a thread 155 may be represented by the following summary for the depicted embodiment. It is noted that various details regarding failure conditions, aborts, etc. are not included in the summary but are described in the detailed treatment of FIGS. 3a and 3b that follows.

Summary of Operations of FIGS. 3a-3b

1. Check, e.g., using a first HTM transaction, whether any locks corresponding to partitions accessed by the programmer-specified transaction are already owned by other transactions.
2. If any of the locks is owned by another transaction, back off and retry the first HTM transaction. If none of the locks are owned by another transaction, try to complete the programmer-specified transaction within the first HTM transaction, without actually acquiring any locks. Return an indication of success if the first HTM transaction succeeds in completing the programmer-specified transaction.
3. If the first HTM transaction cannot complete the operations of the programmer-specified transaction (or if the HTM transaction repeatedly finds that locks are owned by other transactions), start an STM transaction.

4. Within the STM transaction, (a) identify a set of partitions expected to be accessed during the programmer-specified transaction (b) acquire the locks for the set of partitions (c) perform the operations of the programmer-specified transaction; and (d) release the locks. Attempt to acquire the locks (in step (b)) within a single HTM transaction; if this second HTM transaction does not succeed, acquire the locks using a blocking mechanism that avoids deadlock by ordering the lock requests based on the addresses of the corresponding memory location. Also, a single HTM transaction may be used to release the locks (step (d)).

In the embodiment depicted in FIGS. 3a and 3b, FLTM manager 105 may be configured to first partition the data object 120, e.g., either autonomously or according to a programmer-specified policy, and associate respective locks 135 for the partitions 130 of the data object (block 305 of FIG. 3a). The data object 120 may, for example, be partitioned at the time memory for the data object is allocated and/or initialized in some embodiments; in other embodiments, partitioning may occur after initialization, and/or the data object 120 may be dynamically repartitioned from time to time. A thread 155 managed according to the techniques employed by FLTM manager 105 may be configured to attempt to perform a programmer-specified transaction using a first non-blocking transaction, such as an HTM transaction (block 310). (In embodiments where HTM is not supported, the first non-blocking transaction may be attempted using equivalent STM operations instead.) Within the first non-blocking transaction, locks 135 corresponding to all the partitions to be accessed transactionally during the programmer-specified transaction may be inspected (i.e., read, but not written to). If any of the locks are currently owned by another transaction (as determined in block 312), the first non-blocking transaction may be aborted and retried after a back-off period (as shown in block 314).

If none of the locks are currently owned by another transaction, the operations of the programmer-specified transaction may be attempted within the first non-blocking transaction (block 316). If the first non-blocking transaction successfully completes all the operations of the programmer-specified transaction (as detected in block 320), the programmer-specified transaction may be ended, e.g., with a success indicator being returned (block 355, shown in FIG. 3b). For example, the value "true" may be returned from a TransactionCommit( ) call within thread 155. The first non-blocking transaction may thus successfully complete the programmer-specified transaction without actually acquiring, or writing to, any lock 135; locks 135 may only be inspected during the first non-blocking transaction in the depicted embodiment. By avoiding writing to locks 135 in this manner, HTM transactions (if available) may be used to complete programmer-specified transactions, especially in low contention scenarios and/or when the programmer-specified transactions are not very long, without incurring any of the overhead of STM transactions.

However, in embodiments where the first non-blocking transaction is an HTM transaction, it may be possible that the operations of the programmer-specified transaction cannot be completed within the first non-blocking transaction. For example, if the programmer-specified transaction accesses more data than can fit into a transactional cache, or if a cache line comprising data accessed by the transaction happens to be removed from the transactional cache (as part of cache replacement operations on behalf of other transactions), the HTM transaction may fail. If the first non-blocking transaction fails to complete the operations of the programmer-specified transaction (as also detected in block 320 of FIG. 3a), the thread 155 may be configured to resort to an STM transaction to perform a series of operations to actually acquire the locks 135 for partitions to be accessed, and then to perform the operations of the programmer-specified transactions.

As part of this series of operations, an STM transaction may be started and a "look-ahead" version of the programmer-specified transaction may be executed to identify and record the set of locations or partitions expected to be accessed transactionally (block 325). Both an expected read set (a set of locations or partitions 130 expected to be read) and an expected write set (a set of locations or partitions 130 expected to be written to) may be determined, e.g., in order to obtain the required locks in the appropriate lock modes. In one embodiment, the read and write sets may be stored within thread-local variables of the current thread (i.e., the thread whose programmer-specified transaction is currently being executed). The expected read and write sets may be determined based on an inconsistent version of memory in some embodiments (because, for example, operations of uncommitted transactions may be read during the determination of the read and write sets). As a result, the expected read or write sets may differ in some cases from the actual read or write sets when the memory access operations of the programmer-specified transaction are eventually executed, as described below in further detail in conjunction with the description of FIG. 5, which may result in the current transaction being aborted and retried in some embodiments. In some embodiments, modern multiprocessors may support a speculative run-ahead mode of execution, which may be used to perform the look-ahead version of the transaction and collect the read and write sets. If the run-ahead mode execution fails, the read sets and write sets may be collected using software operations that do not rely on the processor run-ahead mode. In other embodiments, where a multiprocessor may support so-called "safe load" instructions that record the outcomes of store operations without actually performing the stores, the expected read and write sets may be determined using such safe load instructions.

After the expected read and write sets have been identified, a second non-blocking transaction (which may also be an HTM transaction) may be initiated in an attempt to atomically acquire the locks 135 for the expected read and write sets, as shown in block 330 of FIG. 3b. Further details on the operations corresponding to block 330 are described below in conjunction with the description of FIG. 4 for one embodiment. If the locks 135 are successfully acquired within the second non-blocking transaction (as determined in block 335), the operations of the programmer-specified transaction may be performed (block 345). If the locks 135 cannot be successfully acquired within the second non-blocking transaction, the thread 155 may use a blocking mechanism to acquire the locks 135 in the order of the addresses of the partitions belonging to the read and write sets (block 340) before performing the operations. Deadlocks may be avoided by acquiring the locks 135 in a consistent address order from all competing threads, e.g., either all threads 155 acquire respective locks 135 in ascending order of partition addresses, or all threads 155 acquire their respective locks 135 in descending order of partition addresses. In this technique, while the threads 155 may have to wait for some locks to be released in such embodiments, cycles in the wait-for graphs may not be formed due to the address-based ordering of the lock requests, and therefore deadlocks may not be possible. After the operations of the programmer-specified transaction have been completed, the locks may be released (e.g., atomically using another non-blocking transaction such as a third HTM transaction) (block 350) and a success indicator may be returned (block 355). Further details regarding the operations corresponding to block 345 and 350 for one embodiment are provided below in conjunction with the description of FIG. 5.

Thus, in embodiments where HTM transactions are supported, FLTM manager 105 may be configured to use the HTM transactions (which may be more efficient than the equivalent STM transactions) within threads 155 as much as possible: first, to complete the programmer-specified transaction if possible without writing to any lock at all; then, to acquire a set of locks atomically, and finally, to release the set of locks atomically. STM transactions may generally be resorted to only if HTM transactions are not available, or do not succeed, in the depicted embodiment. In some embodiments, the decision to resort to STM transactions instead of HTM transactions may be based on other factors, heuristics, or configurable parameters such as a user-specified limit on the maximum number of times an HTM transaction is to be retried before an STM transaction is employed. In addition to attempting to avoid writes during the operations of the first non-blocking transaction (block 310), the FLTM manager 105 may also attempt to avoid writing to ReadCount fields 215 of locks 135 during lock acquisition operations, as described below in further detail. It is noted that various failure conditions may arise during operations corresponding to blocks 330 and 345 of FIG. 3b in some embodiments; these conditions and the responses thereto are also described below.

Figure 4:
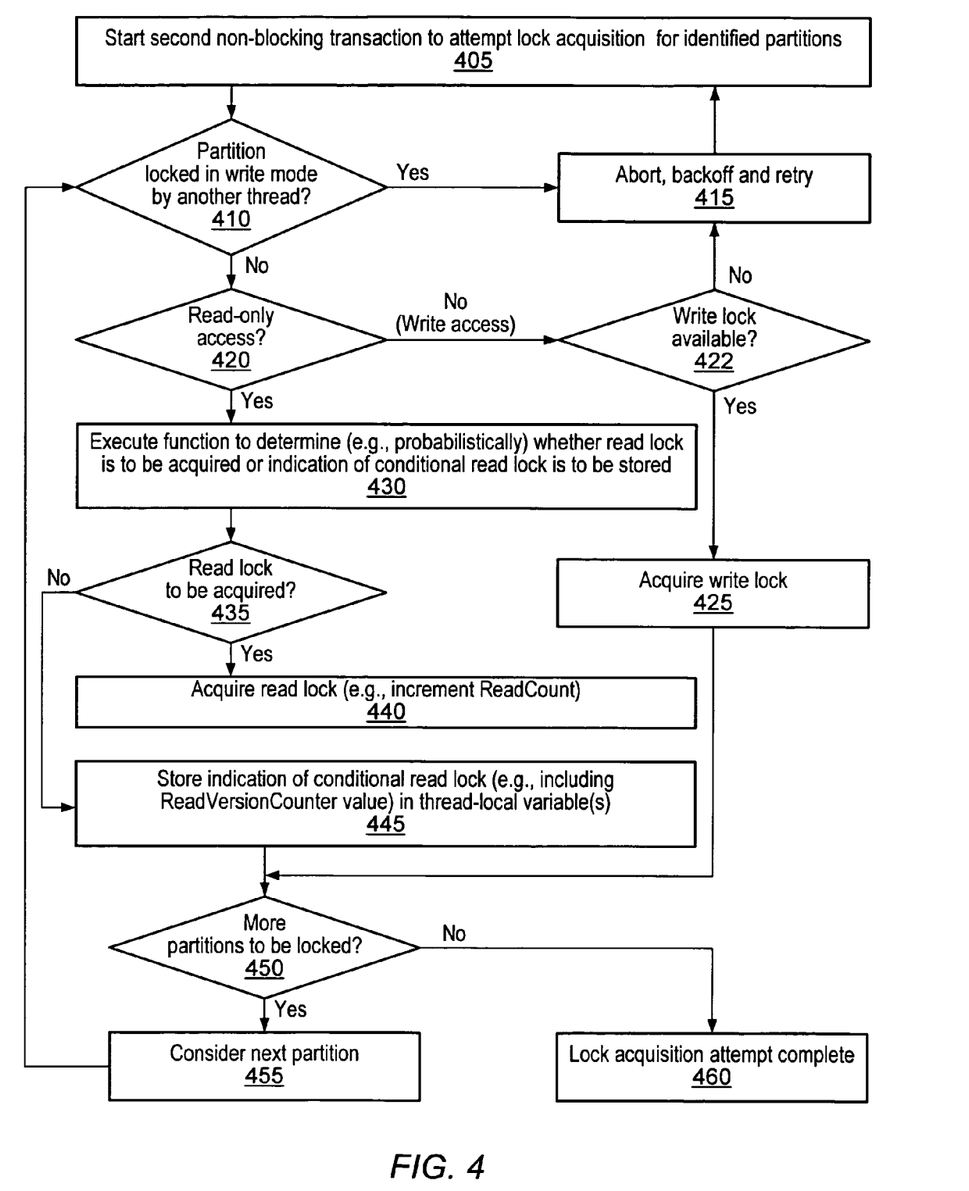
FIG. 4 is a flow diagram illustrating further aspects of the operation of a thread, corresponding to an attempt to acquire the locks for an expected read set and write set within a non-blocking transaction (such as an HTM transaction), according to one embodiment.

FIG. 4 is a flow diagram illustrating further aspects of the operation of a thread 155 managed by FLTM manager 105, corresponding to an attempt to acquire the locks 135 for an expected read set and write set within a second non-blocking transaction (such as another HTM transaction), according to one embodiment. Thus the operations illustrated in FIG. 4 may represent details corresponding to block 330 of FIG. 3b. After the lock acquisition attempt is started within the second non-blocking operation (block 405), the thread 155 may be configured to consider each partition in the read/write sets in sequence. If the partition being considered is already locked in WRITE mode by another thread (as detected in block 410), the non-blocking transaction may be aborted and retried after a back-off delay (block 415). If the partition is not currently locked in WRITE mode, and the current thread has not already acquired the lock, the current thread may perform different actions depending on whether the partition is to be accessed in read-only mode or not. In some embodiments, to determine whether a lock has already been acquired, each thread 155 may be configured to maintain a list of locks already owned during a current STM transaction. If the partition is to be written to (as detected in block 420) and the WRITE lock is available (as detected in block 422), the WRITE lock may be acquired (block 425) and the current thread may proceed to considering other remaining partitions in the read/write sets (block 450). If the partition is to be written to and the lock is currently held in READ_ONLY mode (and therefore not available in WRITE mode, as also determined in block 422), the non-blocking transaction may also be aborted and retried after a back-off delay (block 415). It is noted that different techniques may be used to compute back-off delays depending on the cause of the abort in various embodiments—e.g., a different back-off delay may be used if the reason for the abort was that another transaction holds a needed lock 135 in WRITE mode than if the reason for the abort was that one or more other transactions hold the needed lock in READ_ONLY mode. In some embodiments, the back-off delays may be dynamically adjusted and/or controlled by user-specified or application-specific parameters.

In one embodiment, if it is determined that the lock is currently held in READ_ONLY mode in block 422, in some embodiments the parent STM transaction of the current non-blocking transaction may be aborted.

If the partition is to be accessed in read-only mode (i.e., if the partition is not expected to be modified during the current programmer-specified transaction) (as also detected in block 420) and is currently not locked in WRITE mode, the thread 155 may be configured to perform an optimization in the depicted embodiment in an attempt to further reduce the number of write operations that are performed on locks 135. Instead of simply incrementing the ReadCount field 215 of the lock 135 corresponding to the partition being considered, to indicate that the current thread has now been added to the set of READ_ONLY lock holders, the thread may execute a function to determine whether it should instead store an indication of a conditional read lock (block 430). This function may be referred to as the "increment" function herein. For example, the thread may determine a probability P1(Increment) between 0 and 1 (where 0 indicates 0% probability and 1 indicates 100% probability) to be used in deciding whether to increment ReadCount 215, using the following function in one embodiment:

$P1(\text{Increment})=1/(\text{ReadCount}+1)$

In this embodiment, if ReadCount 215 for the lock 135 is currently zero, the thread may have to increment ReadCount with a probability of 100%. However, if ReadCount is 1, the probability that the thread increments ReadCount may be only 50%; for a ReadCount of 9, the probability falls to 10%, and so on. The higher the current value of ReadCount is, the lower the probability that the thread is to increment ReadCount. The reasoning for using such an increment function is as follows: (a) in general, the fewer write operations that the non-blocking transaction has to perform, the better; therefore, if it is possible to avoid incrementing ReadCount, ReadCount should not be incremented (b) if ReadCount is high, it is more likely that no transaction will be able to acquire the lock in WRITE mode for a while than if ReadCount is low, since ReadCount will have to go down to zero before any writing transaction can acquire the lock in WRITE mode and (c) if no thread acquires the lock in WRITE mode for a period of time, then the data in the partition 130 protected by the lock is not going to change during that period, so acquiring a read lock and incrementing ReadCount may not be necessary at all.

Another increment function P2(Increment), based partly on P1(Increment), may be used in a different embodiment. In the following formula, C may be an integer constant (e.g., 5 or 7):

If (ReadCount>C) $P2=P1(\text{Increment})$;

$P2=1$.

Thus, if the number of concurrent READ_ONLY mode lock holders exceeds C, then P2(Increment) provides the same result as P1(Increment) would; otherwise, if there are only a few (less than or equal to C) currently reading transactions, the current thread may be required to increment ReadCount with 100% probability. P2 may represent a slightly more conservative approach than P1, in that as long as up to C current lock holders exist, the transaction may be forced to increment ReadCount if P2 is used, but may not necessarily increment ReadCount if P1 is used. It is noted that both P1 and P2 may ensure that if the lock is currently unlocked (i.e., if ReadCount is currently zero), the current thread takes the lock in READ_ONLY mode (i.e., the current thread increments ReadCount). Other increment functions may be used in different embodiments.

After the result of the increment function (e.g., P1(Increment) or P2(Increment)) is computed, a probability function may be used to generate a random number between 0 and 1. The result of the probability function may be compared to the result of the increment function to determine the course of action to be taken by the current (reading) thread (block 435). E.g., in one implementation, if the result of the increment function is 0.7 and the probability function returns 0.1 (or any other value between 0.0 and 0.7, inclusive), the thread may acquire the lock 135 in READ_ONLY mode and increment ReadCount 215 (block 440).

If the probability function instead returns a value 0.8 (or any value higher than 0.7) in the above example, the thread may not acquire the lock or modify ReadCount 215, but may instead store an indication of a conditional read lock, e.g., in a thread-local variable, and also store the current value of ReadVersionCounter in a thread-local variable. The value of the ReadVersionCounter field 220 may itself be used as an indication of a conditional lock in some embodiments. The ReadVersionCounter field 220 for a given lock 135 may be implemented as a monotonically increasing integer in one embodiment, and may indicate the number of times that the ReadCount value for the same lock 135 has been reduced from a non-zero value to zero. For example, in one scenario, the initial value of ReadVersionCounter 220 and ReadCount for a particular lock 135 may both be set to zero, and the values of ReadCount (and the corresponding values of ReadVersionCounter) may change as follows over time:

ReadCount values: 0,1,2,1,0,1,2,3,4,3,2,3,2,1,0,1,2,1,0, . . .
ReadVersionCounter values: 0,0,0,0,1,1,1,1,1,1,1,1,1,1,2,2, 2,2,3, . . .

In this example, each time the value of ReadCount changes from a number greater than zero to zero, ReadVersionCounter may be incremented. For example, the third entry (i.e., "2") in the list of ReadCount values indicates that two threads hold the lock 135 in READ_ONLY mode; the following "1" indicates that one of the threads released the lock, and the following "0" indicates that the second of the threads also released the lock, thus reducing the number of concurrent holders of lock 135 in READ_ONLY mode to 0; as a result, ReadVersionCounter is incremented from 0 to 1. As of the end of the exemplary sequence of ReadCount shown above, the value of ReadVersionCounter reaches 3. The value of ReadVersionCounter may remain unchanged during each sub-sequence of ReadCount values between two zero values: e.g., during the subsequence (1,2,3,4,3,2,3,2,1) starting at the $6^{th}$ value of ReadCount in the above example, the value of ReadVersionCounter may remain at 1. Thus, as long as the ReadCounterValue does not change, a thread 155 reading the partition 130 corresponding to the lock 135 containing the ReadCounterValue may be guaranteed that the ReadCount value has not dropped to zero. Since a WRITE mode lock is a precondition for modifying the partition 130 in the embodiment shown in FIG. 4, and a WRITE mode lock may only be acquired if ReadCount is zero, the data stored in partition 130 may be guaranteed to remain unchanged during a period during which the ReadVersionCounter value remains unchanged. A guarantee that partition 130 is not changed for a period of time is exactly what would have been accomplished if a READ_ONLY lock were obtained and held for the period.

Thus, in block 445 of FIG. 4, thread 155 may be configured to store the current ReadVersionCounter value (of the lock 135 corresponding to the partition 130 under consideration) in a thread-local variable, together with an indication of an acquisition of a conditional read lock, which may also be stored in a thread-local variable. The stored value of ReadVersionCounter may later be compared to the current ReadVersionCounter value to determine whether data of the partition 130 may have been modified, as described below in conjunction with the description of FIG. 5. It is noted that since ReadVersionCounter values may increase monotonically (i.e., after ReadVersionCounter reaches a particular value for a given lock 135, it either stays at that value or increases, but does not decrease), in some embodiments, sufficient space may have to be dedicated to ReadVersionCounter fields to ensure that the probability of overflow remains low: e.g., ReadVersionCounter may be stored as a 32-bit word or even a 64-bit word to reduce the chances of integer overflow. In some embodiments, a lock 135 may store a WriteVersionCounter field that is incremented every time the corresponding partition 130 is modified (e.g., rather than a ReadVersionCounter field), and a stored value of the WriteVersionCounter field may be used as (or in addition to) an indication of a conditional read lock.

After acquiring the appropriate lock (i.e., either a WRITE mode lock, a READ_ONLY mode lock, or a conditional read lock) on the partition under consideration, the thread 155 may determine whether any other partitions expected to be accessed during the programmer-specified transaction have not yet been considered (block 450). If no other partitions remain, the lock acquisition attempt may be complete (block 460); otherwise, the next partition may be considered (block 455) and operations corresponding to blocks 410 onwards may be repeated for the next partition. In different embodiments, the order in which the partitions 130 of the expected read/write sets may be locked within the non-blocking transaction started in operations corresponding to block 405 may vary. For example, in one embodiment, the locks may be obtained in order of partition addresses. In another embodiment, the locks may be obtained in the order in which the partitions are expected to be accessed. In a different embodiment, all the WRITE locks may be obtained first, and then all the READ_ONLY or conditional read locks may be obtained, or all the read locks may be obtained before any WRITE lock is obtained.

Figure 5:
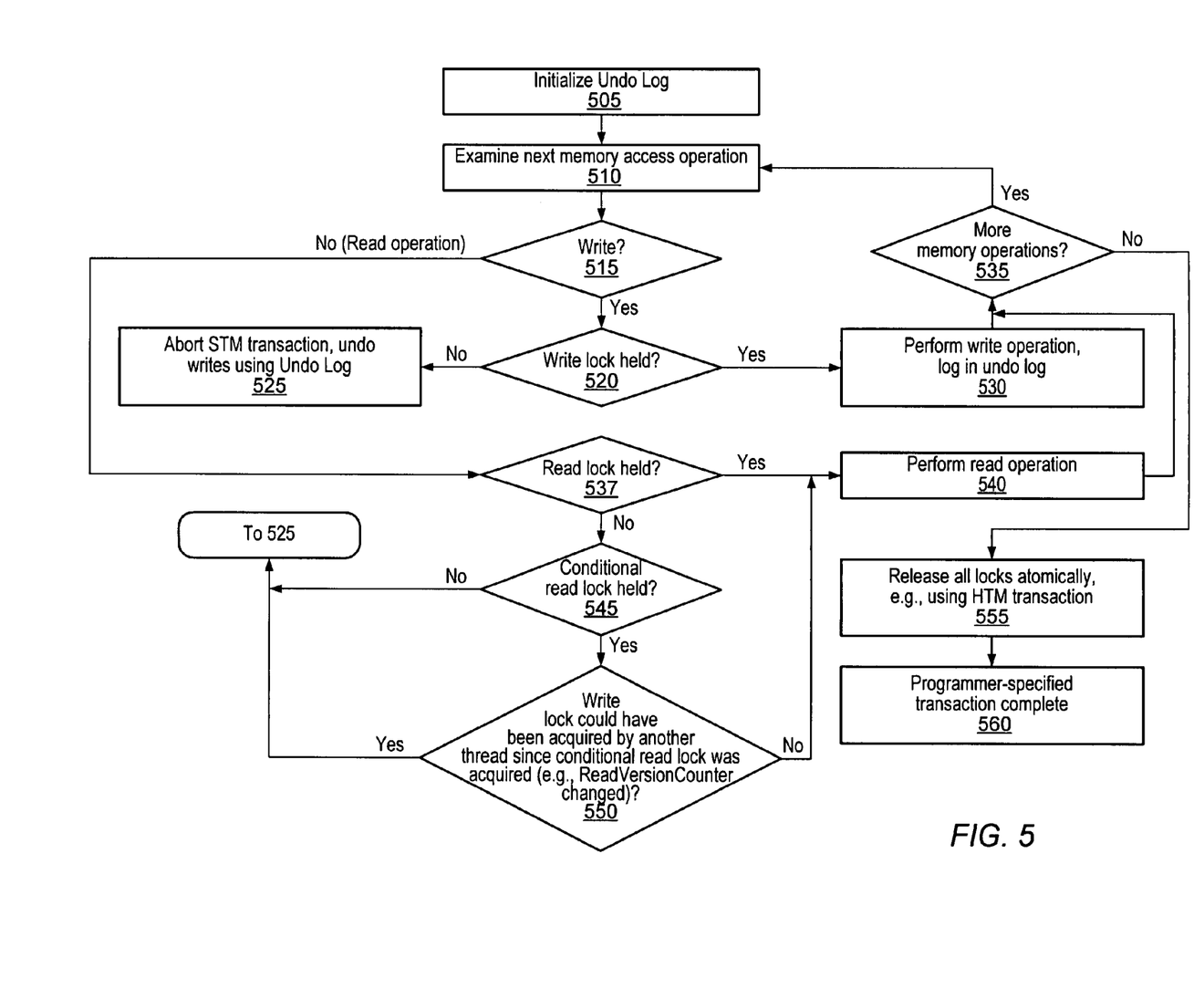
FIG. 5 is a flow diagram illustrating further aspects of the operation of a thread to perform memory access operations of a programmer-specified transaction after the set of locks corresponding to an expected read set and/or an expected write set have been obtained, according to one embodiment.

FIG. 5 is a flow diagram illustrating further aspects of the operation of a thread 155 managed by FLTM manager 105 to perform memory access operations of the programmer-specified transaction after the set of locks corresponding to an expected read set and/or an expected write set have been obtained, according to one embodiment. Thus FIG. 5 may provide details of some of the operations corresponding to block 345 and 350 of FIG. 3b for one embodiment. As noted above, the determination of the expected read and write sets may potentially have been based on an inconsistent version of memory in some embodiments. In addition, it may be possible that even if the read and write sets were determined using a consistent version of memory, other transactions may have modified some partitions 130 since the expected read or write sets were identified, which may also have the effect of changing the read set or the write set of the current transaction. As a result, it may be possible that when the memory access operations corresponding to the programmer-specified transaction are performed, different partitions may have to be accessed than those for which locks were obtained (e.g., in operations corresponding to blocks 330 or 340 of FIG. 3b).

In the embodiment depicted in FIG. 5, an undo log containing entries for memory locations or partitions 130 modified during the STM transaction (started in operations corresponding to block 325 of FIG. 3a) being executed for the current programmer-specified transaction may be maintained. An undo log may also be stored as a thread-local data structure in some embodiments, i.e., a data structure that is only accessible from the current thread 155. Contents of an undo log may be used to reverse or roll back the effects of all of the transaction's writes. As shown in block 505 of FIG. 5, the undo log may be initialized for the current transaction before any of the memory modifications are applied. The next memory access operation to be performed may be considered (block 510). If the access is a write (as determined in block 515), the current thread 155 may be configured to verify that a WRITE mode lock 135 is currently held for the corresponding partition 130 (block 520). If the WRITE mode lock 135 is not held (which may be a result of an incorrect prediction of the write set), the STM transaction may be aborted (block 525) and the effects of its modifications (if any have been applied) may be rolled back using the undo log. (It is noted that the rollback may not require any specialized synchronization operations in the depicted embodiment, since all the locks 135 expected to be needed for the transaction are already held.) If the lock 135 is held in WRITE mode (as also determined in block 520), the write operation may be performed and a corresponding entry may be created in the undo log (block 535). The thread 155 may then determine whether any more memory access operations remain in the current programmer-specified transaction (block 535). If no further operations remain, the locks held by the current transaction may be released atomically in the depicted embodiment (block 555) (e.g., using another HTM transaction) and the programmer-specified transaction may be complete (block 560). In one embodiment, the operations corresponding to releasing the locks (block 555) may include reducing the ReadCount values for locks held in READ_ONLY mode and if the ReadCount value reaches zero as a result, incrementing the ReadCounter value.

If, in operations corresponding to block 515, it is determined that the current memory access operation is a read rather than a write, the thread 155 may be configured to check whether a read lock 135 (i.e., a lock in READ_ONLY mode) is currently held for the partition 130 to be read. If the read lock is held (as determined in block 537), the read operation may be performed (block 540), and the current thread may proceed to process any further remaining memory access operations (block 535).

If, in operations corresponding to block 537, the thread 155 determines that it does not hold a read lock, the thread may be configured to determine whether it holds a conditional read lock, e.g., if it has saved a value of the ReadVersionCounter field 220 of the lock 135 for the partition 130 to be read. If a conditional read lock is not held (as determined in block 545), this means that neither a read lock nor a conditional read lock was obtained for the partition during the lock acquisition operations corresponding to FIG. 4 or block 340 of FIG. 3b, which may indicate that the read set for the transaction was determined incorrectly. If neither type of read lock is held, the STM transaction may also be aborted (block 525).

If a conditional lock is held for the partition 130 to be read (as also determined in block 545), the thread 155 may be configured to check whether a write lock on the partition could have been acquired by another thread since the indication of the conditional read lock was stored (block 550). For example, if the value of ReadVersionCounter value 220 of the lock 135 for the partition 130 was stored when the conditional read lock was acquired, the stored value may be compared with the current value of ReadVersionCounter 220. If the stored value differs from the current value, this may indicate that it is possible that a write lock could have been obtained on partition 130, and that the data of partition 130 could therefore have been modified since the indication of the conditional read lock was stored. If the write lock could have been obtained, the STM transaction may also be aborted (block 525). Otherwise, if write lock could not have been obtained, the read operation may be performed (block 540) and further memory access operations (if any remain) may be processed (block 535 onwards). Thus, the use of a conditional read lock mechanism described above may allow at least some threads 155 to read a consistent version of partition 130 without actually acquiring a corresponding read lock, i.e., without modifying a ReadCount value within a lock 135. In systems where conditional read locks are not implemented, a write operation (to modify ReadCount) may have been required even for read-only operations on partitions 130; thus, the use of conditional read locks as described above may considerably reduce the overhead for concurrent lock-based accesses to data objects 120 in some embodiments.

It is noted that while a given thread 155 managed by FLTM manager 105 using the techniques described above may, under some circumstances, abort its own transaction (e.g., in operations corresponding to block 525 of FIG. 5), a thread may not be required to abort (or commit) any other thread's transactions in the depicted embodiments. In many conventional STM implementations, considerable overhead may be required to allow threads to commit/abort transactions of threads. Even though the FLTM manager 105 may be configured to use STM transactions, e.g., if HTM transactions fail or are not supported, the overhead of managing inter-thread aborts or commits may be avoided in the embodiments described above. It is also noted that operations corresponding to those illustrated in FIG. 3a, FIG. 3b, FIG. 4 and FIG. 5 may be performed in a different order than shown herein.

Figure 6:
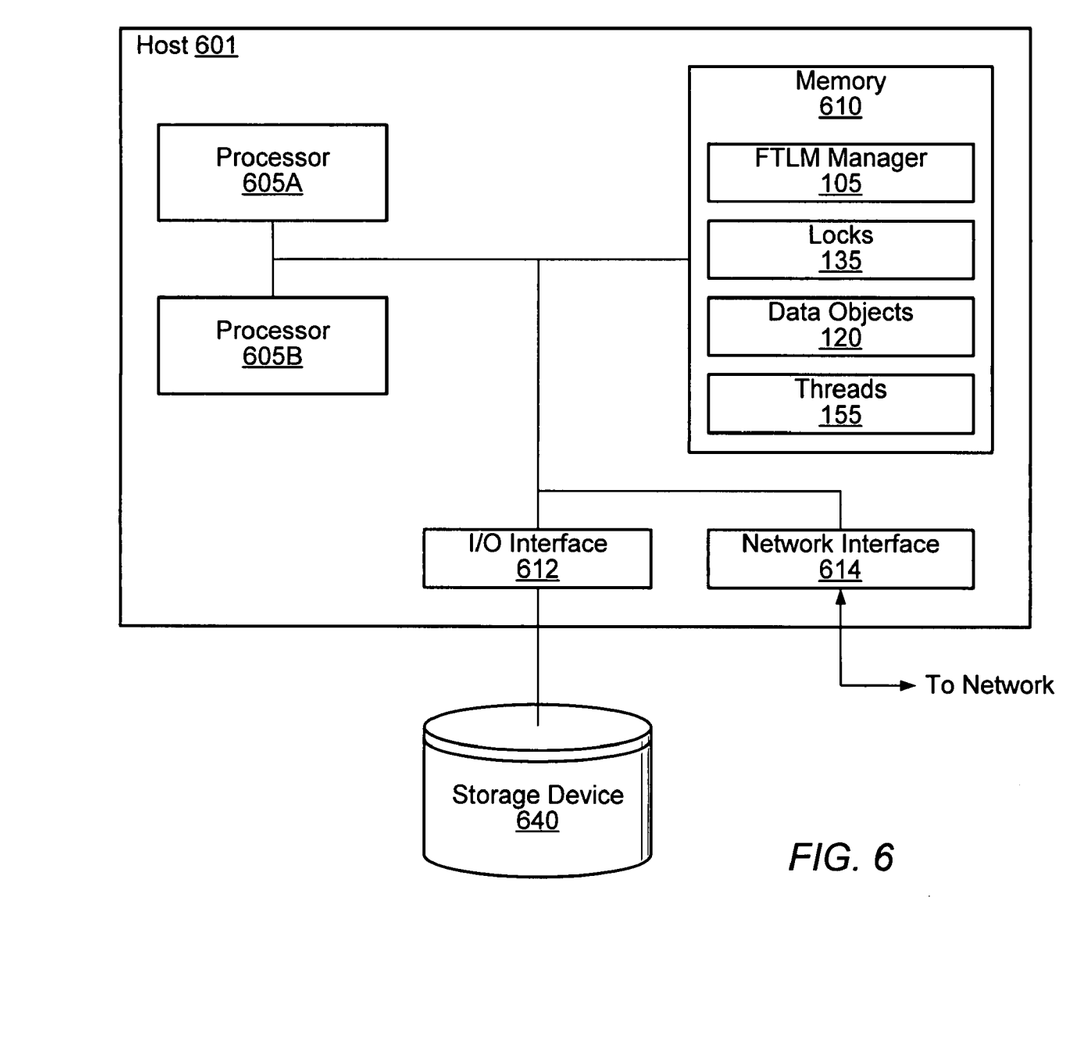
FIG. 6 is a block diagram illustrating a computer host, according to one embodiment.

FIG. 6 is a block diagram illustrating a computer host 601, according to one embodiment. Host 601 may comprise one or more processors 605 (e.g., 605A and 605B), which may be implemented using any desired architecture or chip set, such as the SPARC™ architecture from Sun Microsystems or the x86-compatible architectures from Intel Corporation, Advanced Micro Devices, etc. The processors 605 used in some embodiments may provide support for HTM transactions, such as special transaction management and transactional memory access instructions, transactional caches, enhanced cache coherency protocols, and the like. In some embodiments, the processors 605 may support a run-ahead mode of execution, and/or special "safe load" instructions, which may be used to identify expected read and write sets for programmer-specified transactions as described earlier. Program instructions that may be executable to implement the functionality of FLTM manager 105 and threads 155 may be partly or fully resident within a memory 610 at a given point in time, and may also be stored on a storage device 640. Concurrently-accessed data objects 120 and corresponding locks 135 may also be stored in memory 610 and/or storage device 640 at any given point in time. In some embodiments, FLTM manager 105 may be included within a virtual machine process (such as a Java™ virtual machine (JVM)) in memory 610 at which threads 155 of an application that defines and uses data objects 120 are executed. In various embodiments, threads 155 may implement any type of individual or standalone application (e.g., a database application or a scientific simulation application), an instance or component of a distributed application, etc. Memory 610 may be implemented using any appropriate medium such as any of various types of RAM (e.g., DRAM, SDRAM, RDRAM, SRAM, etc.). In addition to processors 605 and memory 610, host 601 may also include one or more I/O interfaces 612 providing access to storage devices, one or more network interfaces 614 providing access to a network and the like. Any of a variety of storage devices may be used to store the instructions as well as data (e.g., for FLTM manager 105, threads 155, data objects 120 and locks 135) in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    partitioning at least a portion of shared memory accessible concurrently by a plurality of threads, into a plurality of partitions and associating the plurality of partitions with respective locks;
    a first of the plurality of threads attempting to execute as an atomic memory transaction a first set of operations, the first set of operations including accesses to one or more of the plurality of partitions, wherein the accesses are performed in a first transactional mode, said performing the accesses in the first transactional mode being dependent on reading but not on acquiring those of the plurality of locks associated with the one or more accessed partitions;
    receiving an indication that the attempt to execute the first set of operations as an atomic memory transaction in the first transactional mode failed and in response, attempting to execute the first set of operations as an atomic memory transaction in a second transactional mode, said executing the operations in a second transactional mode comprising:
    attempting to execute a second set of operations to acquire a subset of the plurality of locks associated with the partitions accessed by the first set of operations, wherein the second set of operations is executed as an atomic memory transaction in the first transactional mode;
    performing the first set of operations; and
    releasing the acquired locks.

2. The method as recited in claim 1, wherein the first transactional mode comprises a hardware transactional-memory (HTM) transaction.

3. The method as recited in claim 1, wherein said releasing the acquired locks is performed within an other transaction in the first transactional mode.

4. The method as recited in claim 1, further comprising:
    in response to receiving an indication that the attempt to execute the second set of operations failed attempting to acquire the subset of the plurality of locks in a sequence dependent on an ordering of addresses of the partitions corresponding to the subset of locks.

5. The method as recited in claim 1, wherein each lock of the plurality of locks supports a plurality of lock modes including a read mode and a write mode.

6. The method as recited in claim 5, further comprising:
    determining that the first set of operations includes a read but not a write of a particular partition of the plurality of partitions;
    determining, using a probability function, whether a particular lock associated with the particular partition is to be acquired in the read lock mode, or whether an indication of a conditional acquisition of the particular lock is to be stored without acquiring the lock;
    if the lock is to be acquired in the read lock mode, including the particular lock in the subset of locks; and
    if an indication of a conditional acquisition of the particular lock is to be stored,
        storing an indication of the conditional acquisition without acquiring the particular lock; and
        verifying that a write lock on the particular partition has not been acquired on behalf of an other thread prior to reading the particular partition.

7. The method as recited in claim 6, wherein the indication of the conditional acquisition is stored within a thread-local variable of the particular thread.

8. The method as recited in claim 6, wherein the particular lock comprises a read version counter indicating a number of times that a number of concurrent holders of the lock in read mode has changed from a value greater than zero to a value of zero.

9. The method as recited in claim 6, further comprising, if the indication of the conditional acquisition is to be stored, storing a value of the read version counter in a thread-local variable.

10. The method as recited in claim 9, wherein said verifying that a write lock on the particular partition has not been acquired comprises verifying that a value of the read version counter has not changed since the indication of the conditional acquisition was stored.

11. The method as recited in claim 1, further comprising:
    prior to acquiring the subset of locks, executing at least a portion of the first set of operations in a speculative run-ahead mode of operation at a processor to identify at least one of the one or more of the plurality of partitions expected to the accessed by the first set of operations.

12. The method as recited in claim 1 further comprising:
    partitioning the shared memory into the plurality of partitions in accordance with received input.

13. A system, comprising:
    one or more processors; and
    a memory coupled to the processors, wherein the memory stores program instructions executable by the one or more processors to:
        partition at least a portion of shared memory accessible concurrently by a plurality of threads, into a plurality of partitions and associate the plurality of partitions with respective locks;
        a first of the plurality of threads attempting to execute a first set of operations as an atomic memory transaction, the first set of operations including accesses to one or more of the plurality of partitions, wherein the accesses are performed in a first transactional mode, said performing the accesses in the first transactional mode being dependent on reading but not on acquiring those of the plurality of locks associated with the one or more accessed partitions;
    receive an indication that the attempt to execute the first set of operations as an atomic memory transaction in the first transactional mode failed and in response, attempt to execute the first set of operations as an atomic memory transaction in a second transactional mode, said executing the operations in a second transactional mode comprising:
        attempting to execute a second set of operations to acquire a subset of the plurality of locks associated with the partitions accessed by the first set of operations, wherein the second set of operations is executed as an atomic memory transaction in the first transactional mode;

perform the first set of operations; and release the acquired locks.

14. The system as recited in claim 13, wherein the first transactional mode comprises a hardware transactional-memory (HTM) transaction.

15. The system as recited in claim 13, wherein the instructions are further executable to:

respond to receiving an indication that the attempt to execute the second set of operations failed, attempt to acquire the subset of the plurality of locks in a sequence dependent on an ordering of addresses of the partitions corresponding to the subset of locks.

16. The system as recited in claim 13, wherein each lock of the plurality of locks supports a plurality of lock modes including a read mode and a write mode, and wherein the instructions are further executable to:

determine that the first set of operations includes a read but not a write of a particular partition of the plurality of partitions;

determine, using a probability function, whether a particular lock associated with the particular partition is to be acquired in the read lock mode, or whether an indication of a conditional acquisition of the particular lock is to be stored without acquiring the lock;

if the lock is to be acquired in the read lock mode, include the particular lock in the subset of locks; and if an indication of a conditional acquisition of the particular lock is to be stored, store an indication of the conditional acquisition without acquiring the particular lock; and verify that a write lock on the particular partition has not been acquired on behalf of an other thread prior to reading the particular partition.

17. A computer readable storage medium, comprising program instructions, wherein the instructions are computer-executable to:

partition at least a portion of shared memory accessible concurrently by a plurality of threads, into a plurality of partitions and associate the plurality of partitions with respective locks;

a first of the plurality of threads attempting to execute a first set of operations as an atomic memory transaction, the first set of operations including accesses to one or more of the plurality of partitions, wherein the accesses are performed in a first transactional mode, said performing the accesses in the first transactional mode being dependent on reading but not on acquiring those of the plurality of locks associated with the one or more accessed partitions;

receive an indication that the attempt to execute the first set of operations as an atomic memory transaction in the first transactional mode failed and in response, attempt to execute the first set of operations as an atomic memory transaction in a second transactional mode, said executing the operations in a second transactional mode comprising:

attempting to execute a second set of operations to acquire a subset of the plurality of locks associated with the partitions accessed by the first set of operations, wherein the second set of operations is executed as an atomic memory transaction in the first transactional mode;

perform the first set of operations; and release the acquired locks.

18. The storage medium as recited in claim 17, wherein the first transactional mode comprises a hardware transactional-memory (HTM) transaction.

19. The storage medium as recited in claim 17, wherein the instructions are further executable to:

respond to receiving an indication that the attempt to execute the second set of operations failed, attempt to acquire the subset of the plurality of locks in a sequence dependent on an ordering of addresses of the partitions corresponding to the other subset of locks.

20. The storage medium as recited in claim 17, wherein each lock of the plurality of locks supports a plurality of lock modes including a read mode and a write mode, and wherein the instructions are further executable to:

determine that the first set of operations includes a read but not a write of a particular partition of the plurality of partitions;

determine, using a probability function, whether a particular lock associated with the particular partition is to be acquired in the read lock mode, or whether an indication of a conditional acquisition of the particular lock is to be stored without acquiring the lock;

if the lock is to be acquired in the read lock mode, include the particular lock in the subset of locks; and if an indication of a conditional acquisition of the particular lock is to be stored, store an indication of the conditional acquisition without acquiring the particular lock; and verify that a write lock on the particular partition has not been acquired on behalf of an other thread prior to reading the particular partition.

* * * * *